United States Patent [19]
Cettin et al.

[11] 3,709,203
[45] Jan. 9, 1973

[54] ANTI-POLLUTION SYSTEM FOR INTERNAL COMBUSTION ENGINES

[75] Inventors: Edward J. Cettin, Ventura; Jimmy P. Pappas, Camarillo; Sam E. Lager, Somis, all of Calif.

[73] Assignee: Thermo-Chem Systems, Inc., Wilmington, Del.

[22] Filed: July 16, 1971

[21] Appl. No.: 163,245

[52] U.S. Cl. ............... 123/119 A, 123/1 A, 123/3, 123/119 E
[51] Int. Cl. ............................................. F02m 25/06
[58] Field of Search ........ 123/119 A, 119 E, 1 A, 2, 3

[56] References Cited

UNITED STATES PATENTS

| | | | |
|---|---|---|---|
| 740,864 | 10/1903 | Jaubert | 123/119 A |
| 1,099,445 | 6/1914 | Jaubert | 123/119 A |
| 1,750,919 | 3/1930 | Becker | 123/119 A |
| 2,017,481 | 10/1935 | Von Opel | 123/119 A |
| 2,187,074 | 1/1940 | Caproni | 123/119 A |
| 2,720,856 | 10/1955 | Hoke, Jr. | 123/119 A X |
| 2,884,912 | 5/1959 | Lewis | 123/119 A |
| 3,425,402 | 2/1969 | Reisacher | 123/119 E |

*Primary Examiner*—Wendell E. Burns
*Attorney*—LeBlanc & Shur

[57] ABSTRACT

A system is presented for use with any internal combustion engine to eliminate carbon monoxide, hydrocarbons and nitrogen oxides from the engine exhaust. The system is substantially closed, eliminating the use of ambient air for combustion of the fuel, and in place thereof utilizes oxygen generated by the thermal decomposition of an alkali metal perchlorate salt in the presence of a catalyst. Heat for the generation of oxygen is provided by the exhaust from the engine manifold. The exhaust and oxygen are then mixed in proportions of 4:1, and the mixture blended with the fuel in the carburetor for combustion in the engine.

15 Claims, 2 Drawing Figures

PATENTED JAN 9 1973

3,709,203

INVENTORS
EDWARD J. CETTIN
JIMMY "P." PAPPAS
SAM "E." LAGER

BY *LeBlanc & Shur*

ATTORNEYS

ANTI-POLLUTION SYSTEM FOR INTERNAL COMBUSTION ENGINES

This invention relates to a method and apparatus adaptable for use with internal combustion engines to eliminate carbon monoxide, hydrocarbons, and nitrogen oxide pollutants normally exhausted therefrom. The device in particular is a substantially closed system which eliminates the use of nitrogen-containing ambient air in the combustible fuel-air mixture. Oxygen is generated in a thermal generator heated by the engine exhaust. The exhaust is also recirculated from the manifold, mixed with the oxygen generated, and the mixture blended with hydrocarbon fuel such as gasoline for combustion in the engine.

The oxygen is generated in the preferred embodiment of this invention by an alkali metal perchlorate salt which, when heated in the presence of a catalyst decomposes to form a metal chloride and oxygen gas.

Within about the last 10 years significant steps have been taken to reduce the pollutants emitted from automobiles. It has now been recognized that automobile exhaust is a major contributor to smog and air pollution, and that air pollution, especially in large cities, is a public health hazard.

The major pollutants emitted by internal combustion engines are carbon monoxide; hydrocarbons such as gasoline, evaporated from the crankcase and the fuel tank, and ethylene, acetylene, and formaldehyde from incomplete combustion; and oxides of nitrogen. Additives, such as tetraethyllead used to boost the octane of gasoline are also emitted in the exhaust.

When the hydrocarbon and nitrogen oxide gases are exposed to sunlight, a photochemical reaction takes place. This reaction forms oxidants, ozone and other reactive oxidizing compounds, which are not only irritating to the eyes and lungs, but which also are toxic to plants and may attack rubber, fabrics, and other materials. In addition, there are strong indications that nitrogen oxides and lead emissions are highly toxic to humans.

The development of anti-pollution devices for automobile engines has been the subject of wideranging research efforts for many years. This research has been directed toward elimination of pollutants from the air, and the development of a "clean" automobile engine.

The first major advance came in 1963 when the positive crankcase ventilator (PCV) was first installed on all new cars. This valve system reduced a typical car's hydrocarbon emissions to 80 percent of the former value. In 1968 exhaust controls were installed which cut hydrocarbon emissions to 37 percent of the pre-1963 levels and reduced carbon monoxide emissions to 40 percent of the previous values. In 1970 exhaust controls cut hydrocarbon and carbon monoxide emissions to 30 percent of their pre-1963 levels.

Devices have also been developed to cut gasoline evaporation losses from the carburetor and fuel tank to reduce total hydrocarbon emissions to 15 percent of those produced by a car with no controls.

A workable system for virtually eliminating evaporative losses of hydrocarbons is now scheduled for nationwide installation on new cars. This system uses activated carbon to soak up evaporating hydrocarbons from the carburetor and fuel tank and releases them through special valves under controlled conditions to be burned in the engine.

Further research to eliminate antiknock lead additives from gasoline and to study the effect of fuel composition in general on smog formation is now being conducted. Although it has not been established with certainity that lead additives are a health hazard, the research results are highly suggestive.

It has, however, been established that lead additives interfere with certain exhaust control systems. For example, catalytic exhaust controls which would greatly reduce the emissions of carbon monoxide and hydrocarbons are poisoned by the lead additives in gasoline.

Leadfree gasoline which would facilitate the use of these catalytic exhaust control systems is not now generally available, but will be in the near future. Catalytic systems to eliminate exhaust pollutants, however, are only partially successful. Effective catalytic exhaust controls for nitrogen oxide emissions have not been developed, as yet.

Therefore, even with the advent of lead-free gasoline, exhaust emission controls will not entirely solve the pollution problem. The remaining obstacle to a "clean" automobile engine then is the elimination of carbon monoxide and the lower unsaturated hydrocarbons, aldehydes, and and nitrogen oxides from the engine exhaust.

Complete combustion of gasoline, a hydrocarbon, will yield carbon dioxide and water vapor. However, engine inefficiency promotes the formation of carbon monoxide instead of carbon dioxide. In addition, to form the combustible mixture, air is mixed with the fuel in the carburetor. Although the active and essential component for supporting combustion, oxygen, makes up only 20 percent of ambient air, the remaining portion, principally nitrogen, does not remain unreacted during the combustion process. The ignition spark in the cylinder forms ozone which catalyzes the formation of several highly toxic nitrogen oxides. These oxides may be carcinogenic and are known to be a dangerous air pollutant. While engine efficiency improvement will reduce the products of incomplete gasoline combustion, so long as ambient air is admitted to the cylinders as in the standard Otto cycle or Diesel engine nitrogen pollutants will be formed and emitted.

One obvious and impractical solution to this problem would be to substitute oxygen for ambient air. This solution is impractical, however, because massive quantities of oxygen would have to be provided, and in addition, the standard automobile engine would have to be redesigned to eliminate excessive peak gas temperatures.

Another attempt to control nitrogen oxide formation involves lowering the peak gas temperatures, thereby minimizing the formation of these oxides. Control of fuel and air flow rates, spark timing adjustments, and lower air intake temperatures all have some effect. In addition, recycling about 10 percent of the cooled exhaust gases also will reduce nitrogen oxide formation, but this method has generally been undesirable because of a reduction of engine performance and fuel economy without elimination of pollutant emission.

Catalytic converters to reduce nitrogen oxide in the exhaust have, as noted above, not been effective. Although research in the area of catalytic converters is proceeding, a practical and inexpensive device has not been discovered.

Therefore, while several procedures have been attempted, a workable system which may be inexpensively adapted to standard automobile engines is not now available.

It has, however, been discovered that the exhaust from the manifold may be recirculated and used in place of nitrogen from ambient air to eliminate the formation of these toxic oxides without loss in engine performance. This solution involves the provision of a thermal oxygen generator which, when heated by the exhaust from the manifold, provides an inexpensive and efficient source of oxygen. The recirculated exhaust is used to heat the generator to produce oxygen and is also substituted for nitrogen in the fuel mixture. The recirculated exhaust then is essentially carbon dioxide and water vapor which may be safely vented to the atmosphere.

The system of this invention includes an oxidizer containing preferably an alkali metal perchlorate salt disposed within a heat exchanger. Hot exhaust gases pass through the exchanger, heating the perchlorate salt and thereby generating oxygen. The oxygen is then mixed with the exhaust gases in the proportion of 1:4 for mixing with the fuel. It should be emphasized that when the system of this invention is at equilibrium the recirculating exhaust will be almost entirely composed of carbon dioxide and water vapor.

If the water vapor is condensed and removed from the exhaust before it is mixed with oxygen for admission to the carburetor, the system of this invention will in effect substitute carbon dioxide and oxygen for ambient air in a substantially closed system which emits principally carbon dioxide and water into the atmosphere.

Because the combustion process in an automobile engine is essentially adiabatic, i.e., $PV^\gamma = K$, thermodynamic work will be a function of the ratio of specific heats ($C_P/C_V = \gamma$). $\gamma$ for air and for nitrogen is 1.4 while $\gamma$ for carbon dioxide is nearly identical, 1.33. Therefore, substitution of carbon dioxide for nitrogen in an oxygen mixture in proportions similar to that of ambient air will produce at least the same thermodynamic work in a given engine.

The system of this invention may be utilized with conventional internal combustion engines without substantial alteration thereof and without loss in output therefrom to eliminate emissions of carbon monoxide, hydrocarbons, and nitrogen oxides in the exhaust.

Accordingly, it is an object of this invention to provide an efficient and inexpensive pollution control system for internal combustion engines to eliminate emission of pollutants in the engine exhaust.

It is another object to provide a pollution control system which may be easily adapted to automobile engines to substitute a carbon dioxide-oxygen mixture for ambient air to form a combustible fuel-air mixture.

It is another object to provide a closed air system for an internal combustion engine having a self-contained, thermal oxygen generator heated by the manifold exhaust, and having a mixing device for mixing oxygen and recirculated gases to eliminate the use of ambient air in the carburetor.

It is yet another object to provide a system for recirculating the manifold exhaust from an internal combustion engine to eliminate incomplete combustion products therein and for cooling said exhaust by using it to generate oxygen by thermal decomposition in a heat exchanger.

It is a further object to provide an anti-pollution system for automobiles to eliminate pollutants in the exhaust and to eliminate use of ambient air in the carburetor wherein oxygen, generated by heating an alkali metal perchlorate salt with recirculating exhaust gases, is mixed in the exhaust and the mixture substituted for ambient air in the fuel-air mixture admitted to the cylinders for combustion.

These and other objects will become readily apparent with reference to the drawings and the following description wherein.

Figure 1:
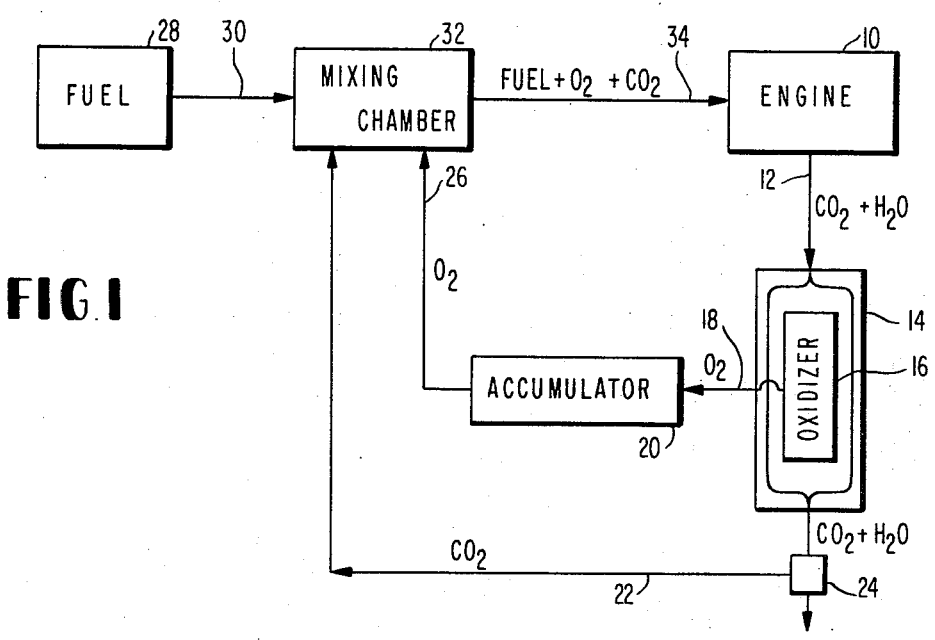
FIG. 1 is a schematic illustrating the anti-pollution system of this invention.

With attention to the drawings, FIG. 1 illustrates the system of this invention adapted to a conventional internal combustion engine 10 which may be a Diesel cycle, but preferably is a conventional Otto cycle automobile engine. The engine exhaust is directed from the manifold (not shown) by line 12 to a heat exchanger 14. The exhaust gases leaving the manifold normally have a temperature at least in the range of 1400°–1800° F. which is sufficient, as will be explained, for the purposes of this invention.

Heat exchanger 14 contains an oxidizer 16 for generating oxygen by thermal decomposition. Oxidizer 16 may be a cannister, having walls of heat-conductive material, containing an alkali metal perchlorate salt and trace quantities of manganese dioxide catalyst. If M = an alkali metal such as lithium, sodium, or potassium, the decomposition reaction is as follows:

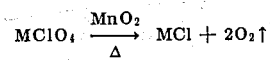

$$MClO_4 \xrightarrow[\Delta]{MnO_2} MCl + 2O_2 \uparrow$$

Although a number of salts such as chlorates, perchlorates, permanganates, perborates, peroxides and peracetates could be used to produce oxygen, the majority are either unstable and explosive, or uneconomical due to a low oxygen yield. Perchlorates, however, may be handled with safety, and are cheap and readily available. Lithium perchlorate is preferred for use in the system of this invention because it may be melted safely and because it contains a high percentage of oxygen. Lithium perchlorate yields oxygen when heated to a temperature of around 250° F. in the presence of a manganese dioxide catalyst which speeds the reaction. The lithium analog contains 60.1 percent oxygen as compared to 45.09 percent available from the sodium salt and 39.17 percent from the potassium salt.

Various metal oxides of for example mercury, manganese, copper, and silver may be used as a source of oxygen, but as stated, lithium perchlorate is preferred for its high yield. In addition, lithium chloride, the byproduct of the oxygen generation reaction may be regenerated to form lithium perchlorate, and therefore the process is reversible.

As the hot exhaust gases enter the heat exchanger 14 and flow around cannister 16 the lithium perchlorate therein decomposes evolving oxygen, which is directed by line 18 from the oxidizer 16 to an accumulator 20.

The exhaust gases after passing through exchanger 14 enter line 22 for recirculation. A valve 24 may also be provided to vent excess exhaust to the atmosphere. Valve 24 is preferably a one-way valve and may be a valve similar to the convention PCV valve.

Water vapor may be removed from the exhaust gas before recirculation, if desired, by any conventional means such as by a condenser (not shown) at valve 24, or by using a desiccant, or by a drain.

Recirculated exhaust gases from line 22, oxygen from accumulator 20 through line 26, and fuel from tank 28 through line 30 are mixed in chamber 32. Chamber 32 may be a conventional carburetor with an ante-chamber wherein the oxygen and the exhaust are mixed. The mixed gases are then blended with the fuel in the carburetor in the conventional manner.

It must be emphasized, however, that the exhaust and oxygen are preferably mixed in a ratio of substantially 4:1 so that the exhaust-oxygen mixture has substantially the same proportions as the nitrogen-oxygen components of ambient air whereby the system is particularly adapted for use in existing internal combustion engines. It will be appreciated, however, that such ratio can be changed for optimum efficiency in accordance with the type of fuel utilized, i.e., gas, diesel fuel and the like and type of engine.

The fuel-gas mixture from chamber 32 is then directed through line 34 to engine 10 for combustion. Any incompletely combusted components of the exhaust are then burned completely when the recirculated exhaust is recombusted. If water vapor is continuously removed from the system at valve 24 the exhaust gas entering chamber 32 will be essentially carbon dioxide. Under normal operating conditions the system will vent only carbon dioxide and water to the atmosphere.

With attention to FIG. 2, the system of this invention may be modified as follows to provide for only a limited use of ambient air when the engine is started.

When engine 10 is started ambient air is drawn through line 40, valve 42, and a conventional filter 44 to carburetor 46. Air is mixed at carburetor 46 in the conventional manner with fuel drawn from tank 28 through line 30.

When engine 10 is started, a heating element 50 disposed within heat exchanger 14 adjacent container 16 is actuated to heat the oxygen containing material therein and to begin thermal decomposition for generation of oxygen. Element 50 may be an electrical resistance heater adapted to be coupled to a battery (not shown). The electric circuit between the element 50 and a source of electrical energy is generally indicated by dashed line 52. It will be obvious to those skilled in the art that any type of circuit may be employed. However, in the preferred embodiment of this invention, the heater would be actuated by the starter switch. The heater may be turned off manually or may be automatically disconnected after a few seconds when the oxygen is being generated.

Oxygen from container 16 is directed through line 54 and a proportioning valve 56, controlled by a venturi or any other conventional flow or pressure sensor, to a mixing chamber 58.

Exhaust from the engine 10 is directed through line 60 and a proportioning valve 62 which is also controlled by a venturi or any other conventional flow or pressure sensor, to mixing chamber 58. Exhaust is also directed from line 60 through line 64 to heat exchanger 14.

Valve 42 is coupled to valve 62 and to valve 56 and is controlled by a conventional pressure or flow sensor. Within a few seconds after startup valve 42 senses a preselected pressure in lines 54 and 60 indicating sufficient oxygen is being generated in heat exchanger 14, and valve 42 closes to shut off the flow of air through line 40. It will be obvious to those skilled in the art that a wide variety of valves and sensors may be adapted for use in lines 40, 54, and 60 within the scope of this invention. The essential function of valve 42 is to stop the introduction of ambient air to engine 10 when the flow through lines 54 and 60 is sufficient to maintain a closed system.

Oxygen and exhaust gases are admitted to mixing chamber 58 in preferred proportions of 1:4 by valves 56 and 62. Valves 56 and 62 are adapted to be coupled together in a conventional ratio and proportioning system. Venturi sensors may be used to sense the flow through lines 54 and 60 for comparison. The signal therefrom would then open or close valves 56 and 62 to insure a continuous flow to chamber 58 in the desired proportions.

A conventional electric, pneumatic, or mechanical coupling between valves 42, 56, and 62 for sensing and regulating the flow through lines 40, 54, and 60 is shown generally at 64. It will be obvious that any type coupling may be used within the scope of this invention.

The preferred 1:4 oxygen, exhaust mixture is then directed from chamber 58 by line 66 to carburetor 46 and engine 10 in the conventional manner. The ambient air utilized when engine 10 is first started is replaced by the oxygen-recirculated exhaust mixture for normal running.

In the event the temperature within cannister 16 in heat exchanger 14 exceeds a preselected optimum level, a safety device may be used to avoid over production of oxygen. In a preferred embodiment thereof a thermocouple 70 is disposed within exchanger 14 and coupled to a bleed valve 72 in exhaust line 64. When normally closed valve 72 senses through thermocouple 70, an excessive temperature within cannister 16, valve 72 opens to vent exhaust gases from line 64 to the atmosphere.

In addition to bleed valve 72, a pressure responsive safety valve may also be utilized in relief line 74 which communicates with cannister 16. The relief line 74 may be adapted to other uses also. For example, line 74 may open into the interior of the automobile or be connected to the vehicle airconditioning system to furnish oxygen to the car interior, if desired.

After exhaust from line 64 passes through the heat exhanger 14 to generate oxygen in cannister 16 it is vented to the atmosphere through line 76. A PCV valve (not shown) may be utilized in line 72 and a portion of the exhaust from line 76 may be dried and recirculated to line 60 in the manner described for FIG. 1, if desired.

In addition to eliminating pollutants from the engine exhaust the device of this invention has the additional advantage of being relatively inexpensive. If lithium perchlorate is used in oxidizer 16, and the oxidizer is a cylinder 1 foot in diameter by 2.0 feet long, the cylinder may be packed with 238 pounds of lithium perchlorate. If the perchlorate salt is melted first, or packed under compression loading this quantity may be doubled. Because lithium perchlorate is 60.1 percent oxygen by weight, 476 lbs. of lithium perchlorate will yield 285.6 lbs. of oxygen gas. Assuming three pounds of oxygen is required per pound of fuel this quantity of lithium perchlorate will be sufficient to combust 95 lbs. of gasoline or approximately 15 gallons. Therefore, one cylinder used at a cruising speed of 16 mpg should be sufficient for driving about 250 miles.

In addition, the cylinders may be mounted for easy removal, and recharged when the gasoline tank is filled. Therefore, with the exception of the initial expense of purchasing and installing the system of this invention in an automobile the only additional expense will be in recharging the cylinders to convert lithium chloride to lithium perchlorate.

Figure 2:
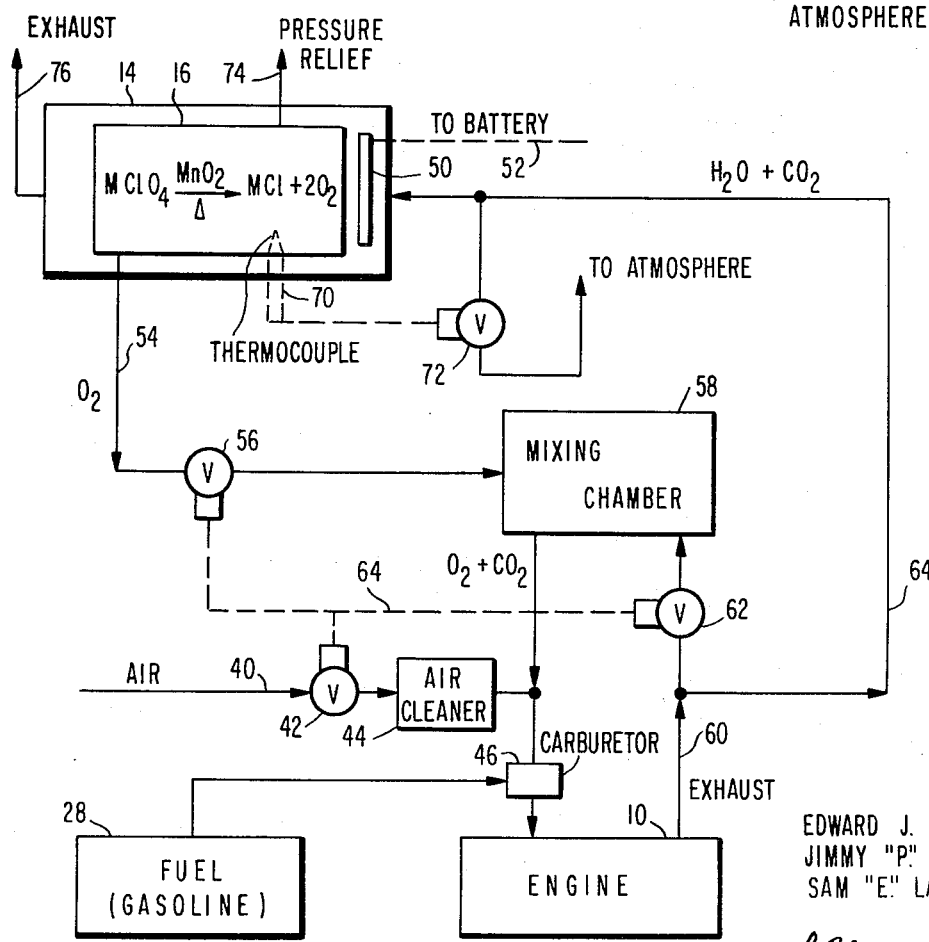
FIG. 2 is a schematic illustrating the system of FIG. 1 with additional modifications according to this invention.

Preferably ambient air is admitted into the system for starting the engine in the embodiment hereof illustrated in FIG. 2. The heater 50 could be utilized to initially heat the thermal oxygen generator to generate sufficient oxygen for starting. The exhaust gases remaining in the system from prior engine operations coupled with the oxygen thus generated by heater 50, permits starting the engine without admission of ambient air.

In summary, in order to eliminate emission of nitrogen oxides and hydrocarbons from air breathing, internal combustion engines without the use of expensive and unreliable filters or reactors in the vehicle exhaust and without reducing the engine performance, the system of this invention eliminates the use of ambient air. It has been discovered that oxygen can be cheaply and efficiently generated by thermal decomposition of lithium perchlorate catalyzed by manganese dioxide in a reversible process. It has also been discovered that the exhaust from the manifold is an excellent medium for heating the perchlorate salt to generate oxygen.

In addition, by recirculating the exhaust with oxygen from the generator a closed system is provided with the recirculated exhaust replacing the nitrogen component in ambient air. When the exhaust is recirculated the carbon monoxide and hydrocarbons therein are fully combusted to carbon dioxide and water which may be safely vented to the atmosphere.

The invention may be embodied in other specific forms without departing from the spirit or essential characteristics thereof. The present embodiment is therefor to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An anti-pollution system for use with an internal combustion engine to eliminate the use of ambient air in the fuel-air blend combusted in the engine cylinders to drive the engine, the improvement comprising:
   means defining a passage having an inlet and an outlet, and a thermal decomposition oxygen generator disposed in heat exchange relation with said passage means between the inlet and the outlet thereof, said inlet adapted to be coupled to the engine exhaust outlet so that exhaust from the engine is admitted through the inlet to the interior of said passage means to heat the oxygen generator and produce oxygen:
   proportional mixing means in communication with the oxygen generator, and the engine exhaust outlet, for mixing oxygen and exhaust gas in preselected proportions and for conveying the mixture to said engine to be blended with said fuel and combusted to drive said engine.

2. The system of claim 1 wherein the passage means comprises:
   a housing defining a chamber, said inlet and outlet in communication with said chamber;
   a container disposed within said chamber between the inlet and outlet thereof, said container having an oxygen-containing, thermally decomposable compound therein;
   means within said chamber for directing hot engine exhaust gases through said chamber and about said container to heat said container and said compound so that as the exhaust gases pass through the said chamber said compound is heated and decomposed to generate oxygen.

3. The system of claim 2 wherein said compound is an alkali metal perchlorate salt and said container further contains a catalyst for the thermal decomposition reaction.

4. The system of claim 3 wherein said compound is lithium perchlorate and said catalyst is manganese dioxide.

5. The device of claim 2 wherein said container has an outlet, said mixing means being connected to the chamber outlet and to the container outlet, said means communicating with the engine exhaust outlet through said chamber.

6. The device of claim 5 further comprising a one-way, positive ventilator valve mounted on the chamber outlet for opening responsive to a preselected pressure therein to vent at least a portion of the exhaust gas from said chamber.

7. The device of claim 5 further comprising means connecting said chamber outlet and said mixing means for directing said exhaust gas from said outlet to said mixing means and for removing at least a portion of the water vapor from said exhaust gases.

8. The device of claim 2 further comprising a one-way pressure relief valve communicating with the interior of said container for venting said container to the atmosphere responsive to a preselected pressure therein.

9. The system of claim 1 further comprising a normally closed, temperature responsive, one-way, valve adapted to communicate with the inlet of said passage means and with the ambient atmosphere; temperature sensing means disposed within said passage means and coupled to said valve for sensing the temperature within said oxygen generator and for conveying a signal to said valve when said temperature exceeds a preselected maximum so that when the temperature within said generator exceeds the preselected maximum said valve opens to vent the exhaust gases normally entering the passage means to the atmosphere.

10. An anti-pollution system for eliminating nitrogen oxides and for reducing carbon monoxide and hydrocarbons from the exhaust of an automobile engine comprising:

means defining a passage having an inlet in communication with the engine manifold and an outlet, said passage means adapted to receive hot exhaust gases from the engine at the inlet, and to expel the cooled gases at the outlet;

a container disposed in heat exchange relation with said passage means between the inlet and the outlet thereof, said container having an outlet, and having heat conducting walls so that when the hot gases pass through said passage means said walls and interior of said container are heated;

an alkali metal perchlorate salt material disposed within said container, said salt adapted to decompose when heated to generate oxygen gas;

mixing means is communication with the outlet of said container, with the engine manifold, and with the engine carburetor for mixing oxygen from said container and exhaust gases from said engine, and for directing the mixture into the carburetor to be blended with the fuel for combustion in the engine.

11. The system of claim 10 further comprising:

first valve means in communication with the inlet of said container and with said mixing means for controlling the flow of oxygen from said container to said mixing means;

second valve means in communication with said engine manifold and with said mixing means for controlling the flow of exhaust gas from the manifold to the said mixing means;

flow responsive valve control means coupled to said first and second valve means for admitting oxygen and exhaust gases to said mixing means in a preselected proportion.

12. The system of claim 11 wherein the valve control means admits about four parts exhaust gas per part of oxygen to said mixing means.

13. The system of claim 10 wherein the alkali metal perchlorate salt is lithium perchlorate and the catalyst manganese dioxide is admixed therewith.

14. The system of claim 11 further comprising an electrical heating element, disposed within said passage means adjacent said container, said element adapted to be selectively coupled to a source of electrical energy when said engine is started and adapted to be uncoupled therefrom when the exhaust gases entering the passage means exceed a preselected maximum temperature.

15. The system of claim 13 further comprising:

third valve means communicating with the engine air inlet and with the carburetor for controlling the flow of ambient air to the carburetor and second valve control means coupled to said third valve means and said first valve control means for closing said third valve means to stop the flow of ambient air to said carburetor in a preselected time after said first control means admits oxygen and exhaust gas to said mixing means.

* * * * *

UNITED STATES PATENT OFFICE
CERTIFICATE OF CORRECTION

Patent No. 3,709,203                    Dated January 9, 1973

Inventor(s) Edward J. Cettin, Jimmy P. Pappas, Sam E. Lager

It is certified that error appears in the above-identified patent and that said Letters Patent are hereby corrected as shown below:

In Column 7, line 54, "therefor" should read --therefore--.

In Column 9, line 19, Claim 10, "is" should read --in--.

Signed and sealed this 10th day of July 1973.

(SEAL)
Attest:

EDWARD M. FLETCHER, JR.                Rene Tegtmeyer
Attesting Officer                      Acting Commissioner of Patents